Figure 1:
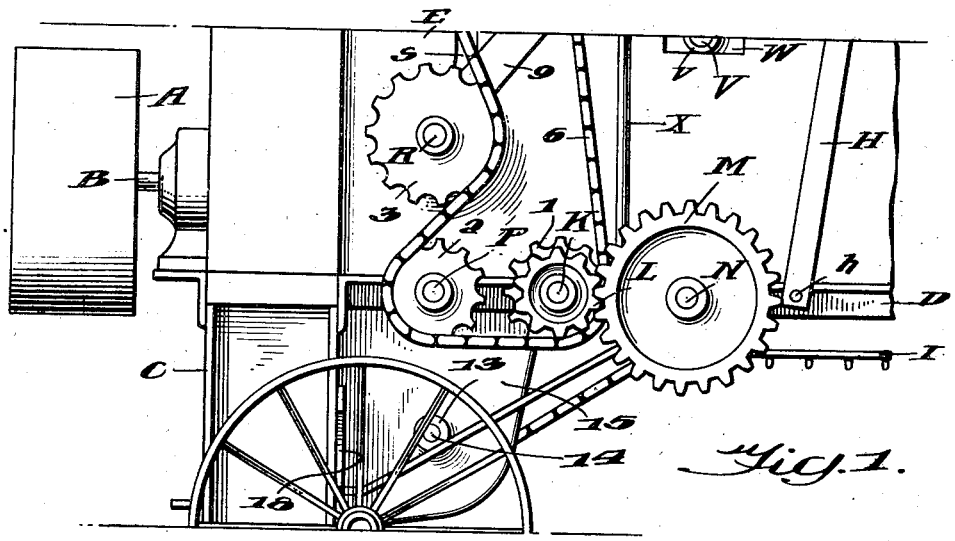

Aug. 19, 1947. M. L. SENSENIG 2,426,059
ROUGHAGE CUTTER AND LITTER DISPOSAL DEVICE
Filed May 3, 1945 2 Sheets-Sheet 1

Inventor
Miles L. Sensenig,

By Babcock & Babcock
Attorneys

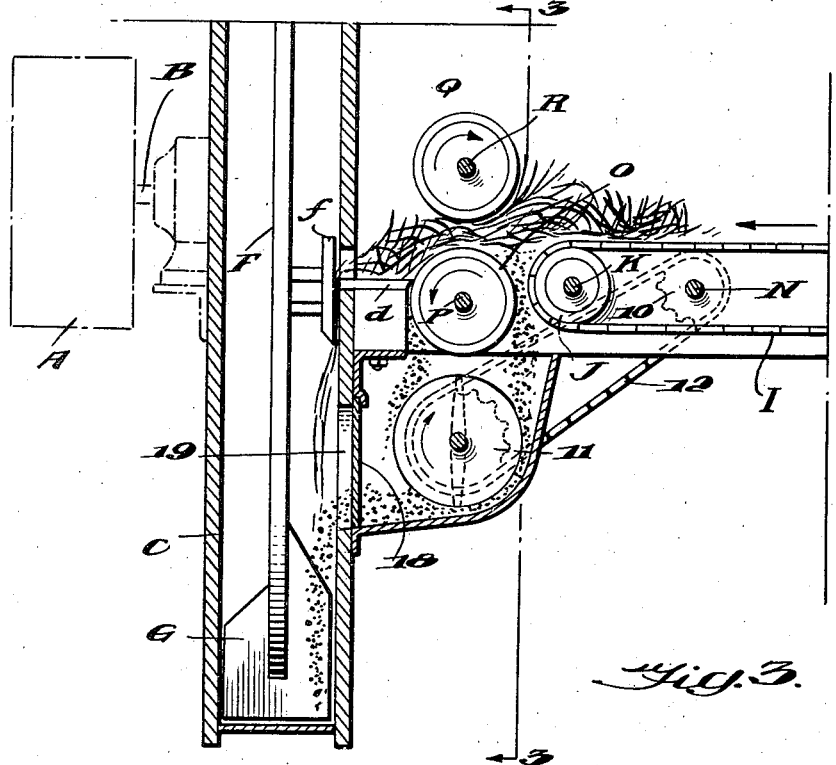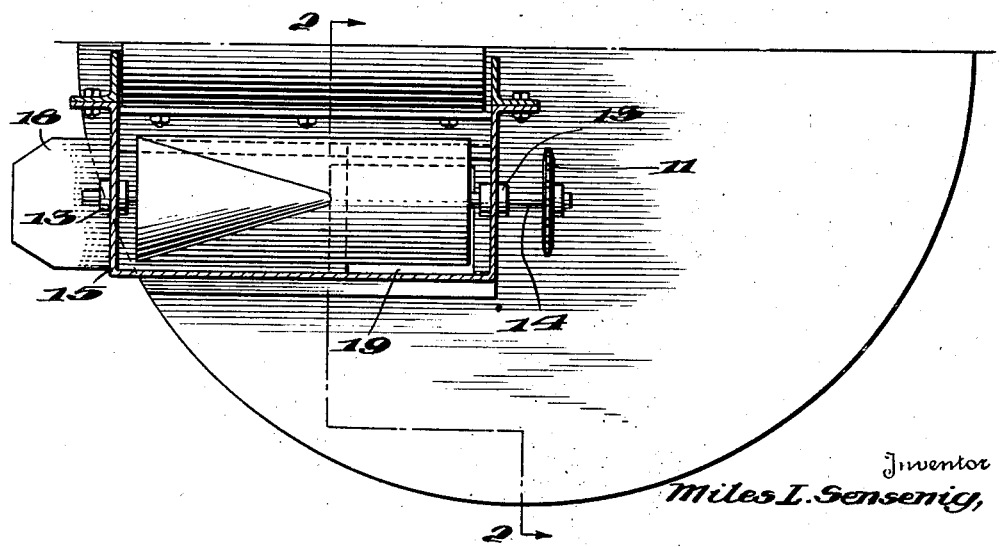

Patented Aug. 19, 1947

2,426,059

UNITED STATES PATENT OFFICE 2,426,059

ROUGHAGE CUTTER AND LITTER DISPOSAL DEVICE

Miles L. Sensenig, Lancaster, Pa., assignor to Dellinger Manufacturing Company, Lancaster, Pa., a corporation of Pennsylvania Application May 3, 1945, Serial No. 591,663

5 Claims. (Cl. 146—107)

This invention relates to litter disposal devices or means for use primarily on straw and feed cutters or choppers or ensilage machines although not necessarily limited to such fields of use.

The primary objects of the present invention are to provide simple, efficient and certain means for receiving and collecting the litter as it drops between a conveyer belt or feed table and a feed roll or other feed means or between said feed means and some other part and for conveying or directing it as it falls from one portion of the receiving hopper or pan to another portion thereof and positively expelling it from said latter portion into the chopper and evacuating housing from which it is evacuated along with the ensilage or other cut or chopped material; to provide a construction which will guard against such litter being blown back out of the receiving hopper or pan to fill the air with dust and form an objectionable pile of dusty material on the floor or about the ensilage cutter or chopper with resultant unpleasant and unhealthy working conditions for the ensilage machine or cutter or chopper operators; to provide a disposal device or means which will expel as it collects the litter from the receiving hopper or pan into a suction zone of an exhausting device; to provide a disposal means which will efficiently handle the litter from any and all green, dry, short, long, light or heavy forage or roughage materials or other materials being operated upon; and to provide means for regulating the size of the opening from the disposal device into the exhauster means in accordance with the speed of operation of the cutter or chopper and the nature of the material being operated upon.

It has been found that in ensilage and other cutters or choppers employing a feed apron or some other suitable feeding means that there will be a certain amount of the material broken into small particles or shredded or reduced almost to a powder and which will fall between the end of the feed or conveyer apron and the lower feed roll, or between the lower feed roll and the cutter bar and be deposited on the floor or ground in a pile with some of it being blown about as it falls and other portions of it being picked up from the pile by the action of the exhaust fan and other moving parts of the machine to saturate the air around the machine with the litter dust to such extent as to make the conditions of work for the machine operators needlessly unpleasant and objectionable from a health standpoint, and this is particularly so in connection with that type of ensilage cutter or straw chopper which employs a cutter disc equipped with fan exhaust blades or paddles to function both as a cutter and blower, and my present invention is particularly directed to the curing of this difficulty in cutters or choppers of this type.

Figure 4:
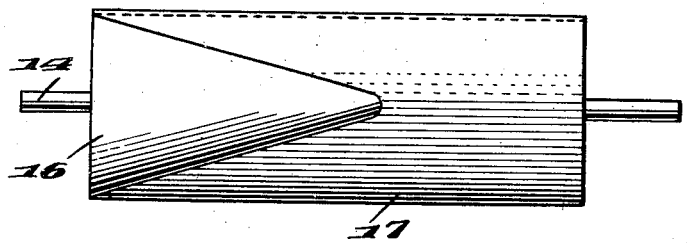
Figure 5:
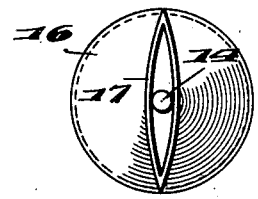

In the accompanying drawings:

Figure 1 represents a side elevation of that part of such an ensilage cutter adjacent the cutter and blow housing with a litter disposal means embodying my invention applied thereto;

Figure 2, a sectional view through such portion of such ensilage cutter and litter disposal means taken on the line 2—2 of Fig. 3 with the cutter and blower disc, the feed rolls, the conveyer or feed apron and its roller or pulley, and the litter conveyer cone and paddle means shown in elevation and looking in the direction of the arrows;

Figure 3, a sectional view on the line 3—3 of Fig. 2, looking in the direction of the arrows, with the lower part of the lower feed roll, the litter conveyer cone and paddle means or element being shown in elevation as is also the shaft 14 with its bearings 13 and the driven sprocket 11 for said element;

Figure 4, a side elevation of said element and its shaft;

Figure 5, an end elevation thereof; and

Figure 6:
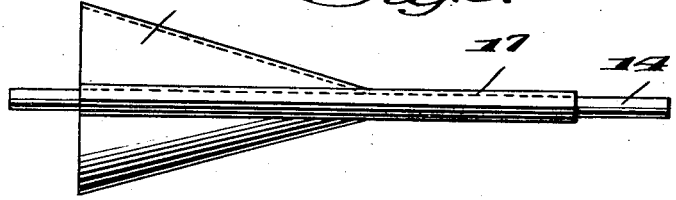

Figure 6, an edge elevation at right angles to the elevation shown in Figure 4.

Referring now in detail to the drawings, A designates a main drive pulley to be driven by a belt, not shown, in turn driven by any suitable means such as a tractor, not shown, said pulley A being mounted upon a shaft B for rotation therewith to rotate the combined cutter and exhaust fan disc F secured to said shaft B to rotate therewith in the housing C from which the cut or chopped material is delivered or exhausted through the usual delivery spout, not shown. Suitable cutter blades $f$ and fan blades or paddles G are mounted upon or carried by the disc F as usual.

Said shaft B is mounted in suitable bearings secured to the frame D and in addition to driving the cutter and exhaust disc F as mentioned, it also serves to drive through suitable shafting and gearing, not shown, the shaft N and gear wheel M, which meshes with gear wheel L keyed to shaft K and the drive sprocket wheel 10 keyed to the shaft N so as to turn therewith but on the end portion of shaft N distant from gear wheel M.

A sprocket wheel 1 is keyed to shaft K to turn therewith, and an endless band sprocket chain 6 passing around sprocket wheel 1 and driven thereby passes around suitable idler sprocket wheels, not shown, and between sprocket wheels 2 and 3 respectively keyed to fixed axis lower shaft P and movable axis upper shaft R to rotate the lower feed roll O and the upper feed roll Q respectively keyed to the shafts P and R in opposite directions as indicated by the arrows in Fig. 2.

The shaft R may rise and fall in the arcuate slots S in the sides E of the cutter box in accordance with variations in the thickness of the layer of material being fed.

The endless conveyer belt or feed table I travels in the direction shown by the arrow in Figure 2, being driven by the roller J which is driven by gear M and gear L to rotate in the same direction as lower feed roll O and oppositely to shaft N, gear M and drive sprocket 10.

The direction of movement of the parts may be reversed by shift lever H connected to control rod h and control means, not shown, associated with the latter.

A tension rod X mounted on the frame D and supporting an arm, not shown, carrying a tension idler, not shown, serves to maintain the feed roll drive chain 6 under proper tension.

A supplementary upper feed roll is mounted to rotate about the axis of a shaft V extending through slots W in the sides E of the cutter box, said shaft being provided with bearing sleeves v in which it rotates, said collars resting upon the bottom edges of the slots W when said shaft V is in its lowest position.

With the exception of the sprocket wheel 10, all of the parts above mentioned and their relationships are shown and briefly referred to as above simply to give a clear exposition of the setting or background of my invention or a clear exposition of one form of machine to which my invention is to be applied, and it is preferred that my present invention be driven through suitable drive connections from a part of the machine driven by the main drive shaft.

The front face of the housing C, that is the face presented toward the feed rolls O and Q is formed with an intake opening 19 for the litter, which may be covered in varying degrees by a slide 18 suitably guided and adjustable in position to vary the operative area of the opening 19 to suit the speed of operation and the nature of the material being operated upon, the opening 19 being so located in the wall or face of the housing C with relation to the axis thereof and of the cutter and blower disc F and the size and radial location thereon of the blower blades or paddles G as to lie radially inward of the blower zone of the fan and to be disposed entirely within the suction zone of the fan, so that all material discharged through said opening 19 into the housing C will be sucked into said housing C and not blown forward and out of the machine by a blast of air blowing out of said opening 19.

A suitable hopper or pan 15 having a front, bottom and sides of unbroken area, and with slightly rearwardly and downwardly inclined front and bottom walls is suitably secured, as by being bolted to the frame D in such position as to make a tight joint by its rear side and bottom edges with the front face of the casing C from a point below the lower wall of the opening 19 to a point well above the top wall thereof and has its top preferably entirely open and disposed directly beneath the stationary cutter bar d, the lower feed roll O and a portion of the rear roller or drive roller J of the traveling apron or conveyer I so as to receive litter dropping by gravity between the conveyer or traveling apron I as it passes around the roller J and the lower feed roll O and between the lower feed roll O and the stationary cutter bar d, the upper portion of the front wall preferably extending forward to such extent that its rear or inner face lies in a vertical plane close to or substantially intersecting the axis of the drive roller J.

Within bearings 13 mounted or secured in any suitable manner in the end walls of the hopper 15 is journaled a shaft 14, which is rotated in the same direction as shaft N and oppositely to the lower feed roll O by means of any suitable drive connections, which may take the form of a drive sprocket 10 keyed to the end portion of the shaft N distant from the gear M, a corresponding driven sprocket wheel 11 keyed to the corresponding end portion of the shaft 14 extending to the same side of and beyond the corresponding end of hopper 15 and an endless band sprocket chain 12 trained around the sprocket wheels 10 and 11 to drive the latter from the former.

Keyed or otherwise mounted on the shaft 14 to turn therewith and disposed wholly within the hopper 15 is a composite deflector or collector and kicker or expeller element comprised of a preferably cone shape member 16 disposed on that portion of the shaft 14 extending from adjacent that end of the hopper 15 located at or adjacent to the periphery of the housing C substantially to the adjacent end wall of the litter intake opening 19, with the base of the cone located closely adjacent said end wall of the hopper 15 and with the taper of the cone 16 presented toward the opening 19, and a paddle or kicker member 17 extending axially of the shaft 14 and preferably being parallel or substantially parallel thereto in an axial direction at all points radially of said shaft, the said paddle member 17 extending lengthwise preferably for the full length of said cone portion or element or member 16, plus substantially the full length of the litter intake opening 19, the inclined face of said cone member 16 serving to divert such of the litter as may fall upon it toward the location of the opening 19 where it is positively kicked through said opening by the paddle member 17, the radially outer edges of which extend parallel to the axis of the shaft 14 and act or function as a sweep or scraper, as distinguished from a curvilinear screw which tends to act as a screw or auger and with some kinds of roughage has a tendency to wind the roughage around it and to form a mass that builds up until the parts bind and the apparatus becomes definitely choked.

While the relative proportions of the cone member 16 and the paddle member 17 are preferred they are not vital and these proportions may be varied within reasonable limits, also while it is preferred that the cone member 16 shall be of true cone form as shown and not either convex or concave in an axial direction, even slightly, this is not of vital importance so long as the form and construction are such that the member 16 functions to divert or direct the litter material falling on it toward the uninterrupted portion of the paddle 17 and the litter inlet opening 19.

It is important that the radial edges of the paddle member 17 shall lie substantially parallel to the axis of the shaft 14 and that the radius of the paddle member 17 shall be such that its radial edges will sweep closely adjacent to the lower portion of the inner face of the front wall and the inner or upper face of the front portion of the lower wall of the hopper 15 from a point adjacent one end wall thereof to a point adjacent the other end wall thereof.

I claim:

1. A litter disposal device to be applied to a roughage cutter, said roughage cutter having a cutter and blower housing with a wall formed with a litter inlet opening, said device comprising a hopper having an open top and rear and front, bottom and end walls of unbroken area, and means for securing said hopper in operative position on said roughage cutter with the rear edges of the bottom and end walls of said hopper in tight substantially sealing engagement with the opposed face of said housing and enclosing the litter inlet opening in said housing wall and with its open top disposed closely beneath a feed means for said roughage cutter to receive litter dropping through and between said feed means and adjacent parts of the roughage cutter, in combination with a shaft extending lengthwise of said hopper and journaled in the end walls thereof, means keyed to the end of said shaft to be driven to rotate the latter, means for driving said driven means, and a composite litter deflector and expeller element secured to said shaft to turn therewith and comprising a cone member extending from one end of said element to a point adjacent the adjacent end wall of said opening and tapering from said end toward said opening, and a paddle member of uniform width corresponding to the diameter of the base of said cone and extending from end to end of said element and having its radial edges extending axially substantially parallel to the axis of said shaft.

2. A litter disposal device to be applied to a roughage cutter, said roughage cutter having a cutter and blower housing with a wall formed with a litter inlet opening, said device comprising a hopper having an open top and rear and front, bottom and end walls of unbroken area, and means for securing said hopper in operative position on said roughage cutter with the rear edges of the bottom and end walls of said hopper in tight engagement with the opposed face of said housing and enclosing said opening in said housing wall and with its open top disposed closely beneath a feed means for said roughage cutter to receive litter dropping through and between said feed means and adjacent parts of the roughage cutter, in combination with a composite litter deflector and expeller element journaled in the end walls of said hopper and comprising a cone member extending from adjacent one end wall of said hopper to a point adjacent the adjacent end wall of said opening and a paddle member of uniform width corresponding to the diameter of the base of said cone and extending from adjacent the apex of said cone across said opening and having its radial edges extending axially substantially parallel to the axis of said element, and means for rotating said element.

3. A litter disposal device to be applied to a roughage cutter, said roughage cutter having a cutter and blower housing with a wall formed with a litter inlet opening, said device comprising a hopper having an open top and rear and front, bottom and end walls of unbroken area, and means for securing said hopper in operative position on said roughage cutter with the rear edges of the bottom and end walls of said hopper in tight engagement with the opposed face of said housing and enclosing said opening in said housing wall and with its open top disposed closely beneath a feed means for said roughage cutter to receive litter dropping through and between said feed means and adjacent parts of the roughage cutter, in combination with a composite litter deflector and expeller element journaled in the end walls of said hopper and comprising a cone member with its cone face presented toward said opening and extending from adjacent an end wall of said hopper to a point adjacent the adjacent end wall of said opening, and a paddle member extending from adjacent the apex of said cone across a portion of said opening and having its radial edges extending axially substantially parallel to the axis of said element, and means for rotating said element.

4. A roughage cutter having a cutter housing, a cutter operating in said housing, means for evacuating cut material from said housing, and means for feeding material into said housing to be operated upon by said cutter, said housing having a front wall presented toward said feeding means and formed with a litter inlet opening, in combination with a hopper formed with an open top and rear and having front, bottom and end walls of unbroken area, means for securing said hopper in fixed position with the rear edges of the bottom and end walls of said hopper in contact with said housing wall and disposed about said opening and with the top of said hopper disposed beneath said feeding means in such position as to receive litter dropping from said feed means and adjacent parts, a deflector and expeller element journaled for rotation in the ends of said hopper and comprising a cone member tapering from adjacent one end of said hopper toward said housing opening, and a paddle member of uniform width corresponding to the diameter of the base of said cone member and extending from adjacent one end of said hopper to adjacent the other end thereof and across a portion of said opening and having radial edges extending axially substantially parallel to the axis of rotation of said element, and means for rotating said element.

5. A roughage cutter having a cutting means, a housing receiving the material as cut by said cutting means, means for evacuating cut material from said housing, means for feeding material into said cutting means, and means for driving all of said foregoing means, said housing having a wall presented toward said feed means and formed with a litter inlet opening, in combination with a hopper formed with an open top and rear and having front, bottom and end walls of unbroken area, means for securing said hopper in fixed position with the rear edges of the bottom and end walls of said hopper in contact with said housing wall and disposed about said opening and with the open top of said hopper disposed beneath said feeding means in such position as to receive litter dropping from said feeding means and adjacent parts, a deflector and expeller element journaled for rotation in the ends of said hopper and comprising a cone member tapering from adjacent one end of said hopper toward said opening and a paddle member extending from adjacent the apex of said cone member across a portion of said opening, and means driven by said driving means for rotating said element.

MILES L. SENSENIG.

REFERENCES CITED

The following references are of record in the file of this patent:

UNITED STATES PATENTS

| Number | Name | Date |
| --- | --- | --- |
| 1,569,399 | Schindler | Jan. 12, 1926 |
| 2,004,753 | Gredell | June 11, 1935 |

FOREIGN PATENTS

| Number | Country | Date |
| --- | --- | --- |
| 104,891 | Germany | Aug. 22, 1899 |